US011194960B2

(12) United States Patent
Lee (10) Patent No.: US 11,194,960 B2
(45) Date of Patent: Dec. 7, 2021

(54) SMART CONTENT TEMPLATE RECOMMENDATION SYSTEM AND METHOD

(71) Applicants: BenQ Intelligent Technology (Shanghai) Co., Ltd, Shanghai (CN); BENQ CORPORATION, Taipei (TW)

(72) Inventor: Yueh-Lun Lee, Taipei (TW)

(73) Assignees: BenQ Intelligent Technology (Shanghai) Co., Ltd, Shanghai (CN); BENQ CORPORATION, Taipei (TW)

( * ) Notice: Subject to any disclaimer, the term of this patent is extended or adjusted under 35 U.S.C. 154(b) by 0 days.

(21) Appl. No.: 16/737,922

(22) Filed: Jan. 9, 2020

(65) Prior Publication Data

US 2020/0218517 A1    Jul. 9, 2020

(30) Foreign Application Priority Data

Jan. 9, 2019   (CN) .......................... 201910018050.5

(51) Int. Cl.
| | |
|---|---|
| *G06F 16/438* | (2019.01) |
| *G06F 8/33* | (2018.01) |
| *G06F 40/106* | (2020.01) |
| *G06F 3/0482* | (2013.01) |
| *G06F 16/958* | (2019.01) |

(Continued)

(52) U.S. Cl.
CPC .......... *G06F 40/186* (2020.01); *G06F 3/0482* (2013.01); *G06F 8/33* (2013.01); *G06F 16/4393* (2019.01); *G06F 16/958* (2019.01); *G06F 40/106* (2020.01); *G06T 11/60* (2013.01)

(58) Field of Classification Search
CPC .... G06F 40/186; G06F 16/958; G06F 3/0482; G06F 40/106; G06F 16/4393; G06F 8/33; G06T 11/60
See application file for complete search history.

(56) References Cited

U.S. PATENT DOCUMENTS

| | | | | |
|---|---|---|---|---|
| 8,958,662 B1* | 2/2015 | Grosz | .................. | H04N 21/854 |
| | | | | 382/305 |
| 9,087,035 B1* | 7/2015 | Bandaru | ................ | G06F 16/958 |

(Continued)

FOREIGN PATENT DOCUMENTS

| | | |
|---|---|---|
| CN | 102185855 A | 9/2011 |
| CN | 104765873 A | 7/2015 |

(Continued)

OTHER PUBLICATIONS

Office action of counterpart application by SIPO dated Aug. 4, 2021.

(Continued)

*Primary Examiner* — Roberto Borja (57) ABSTRACT

A smart content template recommendation system including a content editing device, a content management system, at least one content playing device is provided. The content editing device is for a user to edit a client content. The content management system is coupled to the content editing device to receive and analyze the client content uploaded from the content editing device to recommend a target content template. The at least one content playing device is coupled to the content management system to play the target content template recommended by the content management system.

11 Claims, 5 Drawing Sheets

| Client | Picture usage | | | | Video usage | | | | Information widget | | | | Text usage | | | | Layout type | | | | | |
|---|---|---|---|---|---|---|---|---|---|---|---|---|---|---|---|---|---|---|---|---|---|---|
| | ≥0 | ≥1 | ≥6 | ≥11 | ≥0 | ≥1 | ≥2 | ≥3 | QR code | Timer | RSS | Weather forecast | ≥0 | ≥1 | ≥6 | ≥11 | 1 | 2 | 3 | 4 | 5 | 6 |
| A | ✓ | ✓ | ✓ | ✓ | ✓ | | | | | | | | ✓ | ✓ | | | | | | | ✓ | |
| B | ✓ | ✓ | ✓ | ✓ | ✓ | ✓ | | | | | | | ✓ | | | | | | | | | ✓ |
| C | ✓ | ✓ | | | ✓ | ✓ | ✓ | ✓ | | | | | ✓ | ✓ | | | | | | ✓ | | |
| D | | | | | ✓ | ✓ | | | | | | | ✓ | ✓ | | | ✓ | | | | | |
| E | ✓ | ✓ | | | | | | | | ✓ | ✓ | ✓ | ✓ | ✓ | | | | ✓ | | | | |
| F | ✓ | | | | | | | | ✓ | ✓ | ✓ | | | | | | | ✓ | | | | |

(51) Int. Cl.
*G06F 40/186* (2020.01)
*G06T 11/60* (2006.01)

(56) References Cited

U.S. PATENT DOCUMENTS

| | | | | |
|---|---|---|---|---|
| 2002/0138525 | A1* | 9/2002 | Karadimitriou | G06F 16/951 |
| | | | | 715/234 |
| 2010/0058255 | A1* | 3/2010 | Stefanik | H04L 67/36 |
| | | | | 715/866 |
| 2017/0109441 | A1* | 4/2017 | Berk | G06F 16/24575 |
| 2017/0148067 | A1* | 5/2017 | Berk | G06F 16/95 |
| 2018/0150436 | A2* | 5/2018 | Ben-Aharon | G06F 40/186 |

FOREIGN PATENT DOCUMENTS

| | | | |
|---|---|---|---|
| CN | 105988987 A | 10/2016 | |
| CN | 106021383 A | 10/2016 | |
| CN | 106547739 A | 3/2017 | |

OTHER PUBLICATIONS

Office action of counterpart application by Taiwan IP Office dated Sep. 6, 2021.

* cited by examiner

Layout 1

Layout 2

Layout 3

Layout 4

Layout 5

Layout 6

FIG. 3

| Client | Picture usage | | | | Video usage | | | | Information widget | | | | Text usage | | | | Layout type | | | | | |
|---|---|---|---|---|---|---|---|---|---|---|---|---|---|---|---|---|---|---|---|---|---|---|
| | ≥0 | ≥1 | ≥6 | ≥11 | ≥0 | ≥1 | ≥2 | ≥3 | QR code | Timer | RSS | Weather forecast | ≥0 | ≥1 | ≥6 | ≥11 | 1 | 2 | 3 | 4 | 5 | 6 |
| A | ✓ | ✓ | ✓ | ✓ | ✓ | | | | | | | | ✓ | ✓ | | | | | | | | ✓ |
| B | ✓ | ✓ | ✓ | ✓ | ✓ | ✓ | | | | | | | ✓ | | | | | | | | ✓ | |
| C | ✓ | ✓ | | | ✓ | ✓ | ✓ | | | | | | ✓ | ✓ | | | | | | ✓ | | |
| D | ✓ | | | | ✓ | ✓ | ✓ | ✓ | | | | | ✓ | ✓ | | | ✓ | | | | | |
| E | ✓ | ✓ | | | | | | | | | ✓ | ✓ | | ✓ | ✓ | | | | ✓ | | | |
| F | ✓ | | | | | | | | ✓ | ✓ | ✓ | | | | | | | ✓ | | | | |

FIG. 4A

| Client | Picture usage | | | | Video usage | | | | Text usage | | | | Layout type | | | | | |
|---|---|---|---|---|---|---|---|---|---|---|---|---|---|---|---|---|---|---|
| | ≥0 | ≥1 | ≥6 | ≥11 | ≥0 | ≥1 | ≥2 | ≥3 | ≥0 | ≥1 | ≥6 | ≥11 | 1 | 2 | 3 | 4 | 5 | 6 |
| A | ✓ | ✓ | ✓ | ✓ | ✓ | ✓ | | | | ✓ | | | | | | | ✓ | |
| B | ✓ | ✓ | ✓ | ✓ | ✓ | ✓ | | | ✓ | | | | | | | | | ✓ |
| value change | a+1 | a+1 | a+1 | a+1 | a+1 | b+1 | c+1 | c+1 | a+1 | b+1 | c+1 | c+1 | | | b+1 | | | |
| a | 1 | 2 | 3 | 4 | 5 | 5 | 5 | 5 | 6 | 6 | 6 | 6 | | | 6 | | | |
| b | 0 | 0 | 0 | 0 | 1 | 1 | 1 | 1 | 1 | 2 | 2 | 2 | | | 3 | | | |
| c | 0 | 0 | 0 | 0 | 0 | 0 | 1 | 2 | 2 | 2 | 3 | 4 | | | 4 | | | |

SMART CONTENT TEMPLATE RECOMMENDATION SYSTEM AND METHOD

This application claims the benefit of People's Republic of China application Serial No. 201910018050.5, filed Jan. 9, 2019, the subject matter of which is incorporated herein by reference.

BACKGROUND OF THE INVENTION

Field of the Invention

The invention relates in general to a smart content template recommendation system and method.

Description of the Related Art

To increase the marketing effect, many business entities or business places are using "digital signature" to play desired marketing contents. As the prices of large-sized screens are decreasing, the size of the digital signature is getting larger and larger. In many industries, such as the retailing, the medical, the fashion, the automotive, and the technology industry, the digital signature has gained greater and greater popularity. Quality marketing contents displayed on the digital signature not only entertain the users but also convey correct product messages to the users.

Let the content template suitable for the catering industry be taken for example. The content template displayed on the digital signature may include a menu with one side showing texts/prices and the other side showing pictures. Besides, the content template suitable for the hotel industry and the content template suitable for the fashion industry can have their respective style and needs.

Conventionally, the content template is designed by the marketing personnel or the design personnel, and the models or layouts are fixed and may not necessarily meet the users' needs.

Therefore, it has become a prominent task for the industries to provide a suitable content template which can be displayed on the digital signature to maximize the marketing effect.

SUMMARY OF THE INVENTION

According to an embodiment of the present invention, a smart content template recommendation system including a content editing device, a content management system, at least one content playing device is provided. The content editing device is for a user to edit a client content. The content management system is coupled to the content editing device to receive and analyze the client content uploaded from the content editing device to recommend a target content template. The at least one content playing device is coupled to the content management system to play the target content template recommended by the content management system.

According to another embodiment of the present invention, a smart content template recommendation method is provided. The method includes receiving and analyzing a client content to recommend a target content template, wherein a content characteristic parameter of the client content includes any combination of a picture usage, a video usage, an information widget, a text usage, a layout type and an interactivity element.

The above and other aspects of the invention will become better understood with regards to the following detailed description of the preferred but non-limiting embodiment(s). The following description is made with reference to the accompanying drawings.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical characteristics. Given that each embodiment is implementable, a person ordinarily skilled in the art can selectively implement or combine some or all the technical characteristics of any embodiment of the present disclosure.

Figure 1:
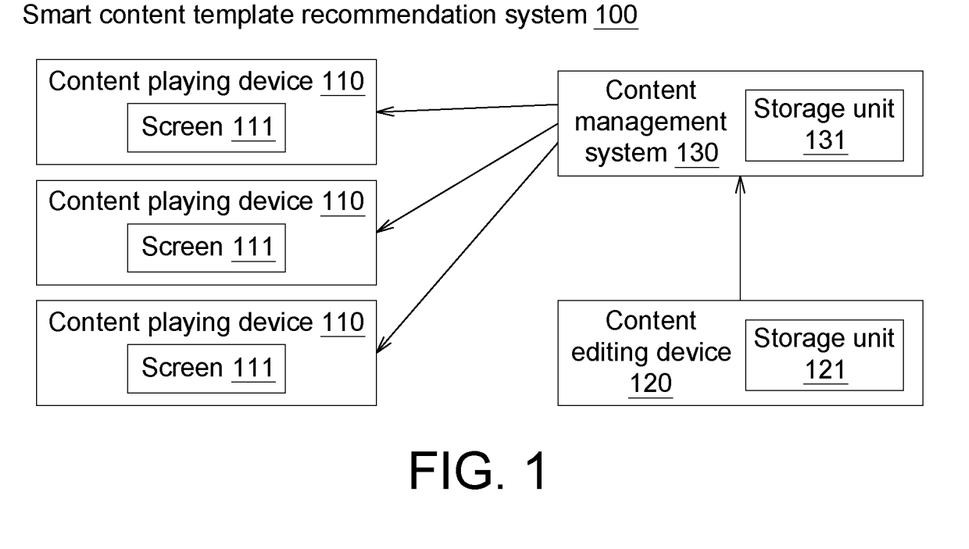
FIG. 1 is a schematic diagram of a smart content template recommendation system according to an embodiment of the invention.

FIG. 1 is a schematic diagram of a smart content template recommendation system according to an embodiment of the invention. As indicated in FIG. 1, the smart content template recommendation system 100 according to an embodiment of the invention includes at least one content playing device 110, a content editing device 120 and a content management system 130. Although 3 content playing devices 110 are exemplified in FIG. 1, the amount of content playing devices of the invention is not limited to 3. For example, the amount of content playing devices of the invention can be more than 3 or less than 3.

The content playing device 110 is disposed in the digital signature to play the target content template transmitted from or recommended by the content management system 130 on a screen 111 of the content playing device 110. The structure and operations of the digital signature are not subjected to specific restrictions here.

The content editing device 120 is for a user to edit a client content and further upload the edited client content to the content management system 130. The content editing device 120 includes a storage unit 121 (for example but not limited, hard-disk drive or compact disk drive or similarity). The content editing device 120 can be realized by a PC, a notebook computer, a smart phone or any devices with information processing ability.

The content management system 130 is coupled to the content playing device 110 and the content editing device 120 to receive and analyze the client content uploaded from the content editing device 120 for recommending a target content template to the content playing device(s) 110. The management system 130 includes a storage unit 131 (for example but not limited, hard-disk drive or compact disk drive or similarity). The content management system 130 can be realized by a cloud server but is not limited thereto. The content management system 130 can provide or recommend a specific target content template to the clients of different industries through big data analysis and the use of smart algorithms to help the clients maximize their marketing effect.

Details of analyzing the client content uploaded from the content editing device 120 by the content management system 130 of the invention are disclosed below.

Figure 2:
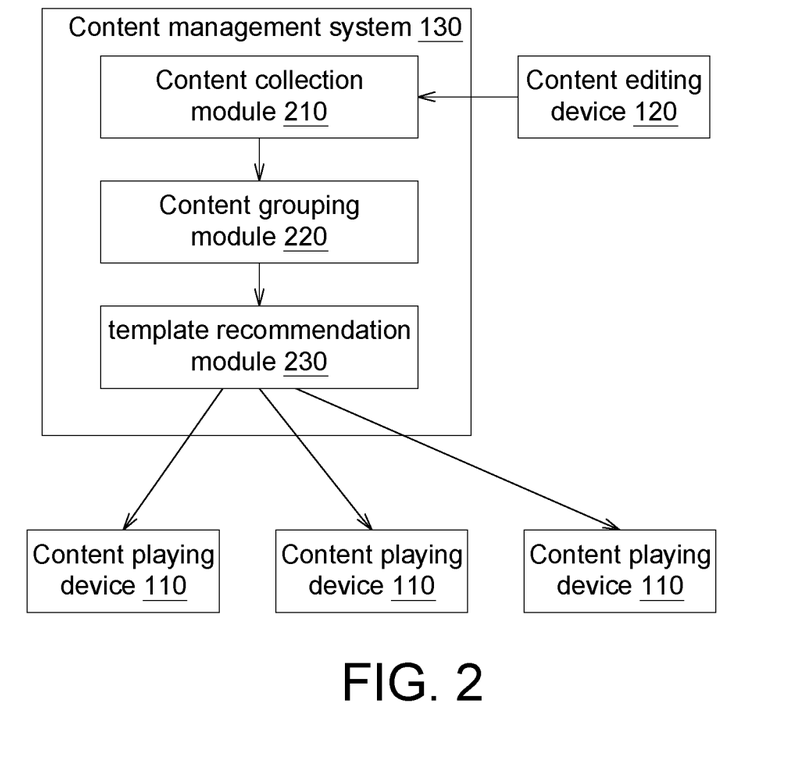
FIG. 2 is a schematic diagram of a content management system according to an embodiment of the invention.

FIG. 2 is a schematic diagram of a content management system 130 according to an embodiment of the invention. As indicated in FIG. 1, the content management system 130 includes a content collection module 210, a content grouping module 220 and a template recommendation module 230.

The content collection module 210 is configured to collect the client content uploaded by the client and perform labelling on the client content according to the industry categories and the content characteristics. For example, the content characteristics of the client content can be divided into 6 categories (the 6 categories are for the purpose of explaining the present embodiment, not for limiting the invention, and other embodiments of the invention can have different categories of the content characteristics): namely, the picture usage, the video usage, the information widget, the text usage, the layout type and the interactivity element. That is, in the embodiments of the invention, the client content includes any combination of at least one picture, at least one video, at least one information widget, at least one text, a layout type and at least one interactivity element.

The picture usage refers to the picture amount used in the client content, and there are several picture usage sub-groups according to the picture usage. For example but not limited by, there are four picture usage sub-groups. The first picture usage sub-group is defined by "the picture usage≥0". The second picture usage sub-group is defined by "the picture usage≥1". The third picture usage sub-group is defined by "the picture usage≥6". The fourth picture usage sub-group is defined by "the picture usage≥11".

The video usage refers to the video amount used in the client content, and there are several video usage sub-groups according to the video usage. For example but not limited by, there are four video usage sub-groups. The first video usage sub-group is defined by "the video usage≥0". The second video usage sub-group is defined by "the video usage≥1". The third video usage sub-group is defined by "the video usage≥2". The fourth video usage sub-group is defined by "the video usage≥3".

The information widget refers to whether the client content uses QR code, timer, really simple syndication (RSS), or weather forecast.

The text usage refers to the text amount used in the client content, and there are several text usage sub-groups according to the text usage. For example but not limited by, there are four text usage sub-groups. The first text usage sub-group is defined by "the text usage≥0". The second text usage sub-group is defined by "the text usage≥1". The third text usage sub-group is defined by "the text usage≥6". The fourth text usage sub-group is defined by "the text usage≥11".

Figure 3:
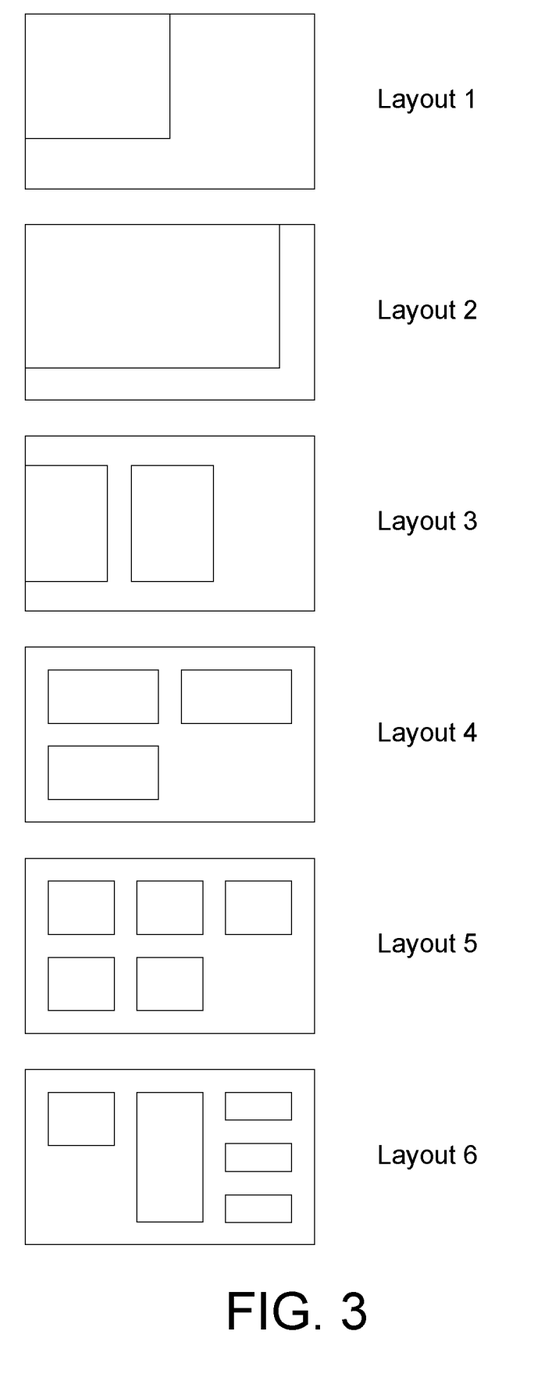
FIG. 3 is a schematic diagram of a layout type used in a client content according to an embodiment of the invention.

The layout type refers to the type of layout used in the client content. FIG. 3 is a schematic diagram of a layout type used in a client content according to an embodiment of the invention. It should be noted that the layout type illustrated in FIG. 3 is for exemplary purpose only, not for limiting the invention, and other embodiments of the invention can have other possible layouts. In the embodiments of the invention, "layout" relates to the shape (such as square, rectangle, and so on), the amount or the position of the arranged picture (s)/video(s). In layout 1, 1 squared picture/video is displayed on the digital signature. In layout 2, 1 rectangular picture/video is displayed on the digital signature. In layout 3, 2 rectangular pictures/videos are displayed on the digital signature, wherein the 2 rectangular pictures/videos are horizontally arranged. In layout 4, 3 rectangular pictures/videos are displayed on the digital signature, wherein some of the 3 rectangular pictures/videos are horizontally arranged and some others are vertically arranged. In layout 5, 5 rectangular pictures/videos are displayed on the digital signature, wherein some of the 5 rectangular pictures/videos are horizontally arranged and some others are vertically arranged. In layout 6, 5 rectangular pictures/videos are displayed on the digital signature, wherein some of the 5 rectangular pictures/videos are horizontally arranged and some others are vertically arranged, and the size of the 5 rectangular pictures/videos may not be consistent.

The interactivity element (or said the interactivity) refers to some interactivity elements included in the client content. In an illustrative rather than a restrictive sense, the interactivity elements are such as hyperlinks, icons controlled by the user, and user input elements (for example, the user may input by clicking or inputting text). The larger the hyperlink amount, the better the interactivity. The more icons controlled by the user, the better the interactivity. The more user inputs element, the better the interactivity.

Figure 4A:
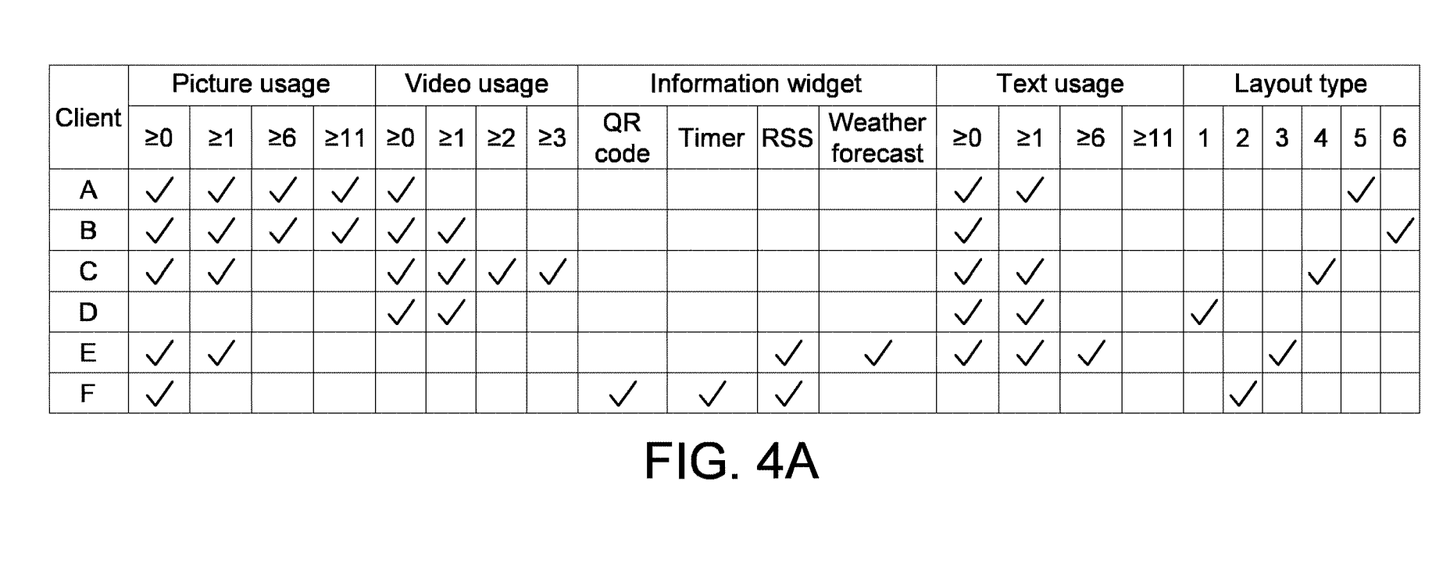
FIG. 4A is a schematic diagram of the contents uploaded by multiple clients.
Figure 4B:
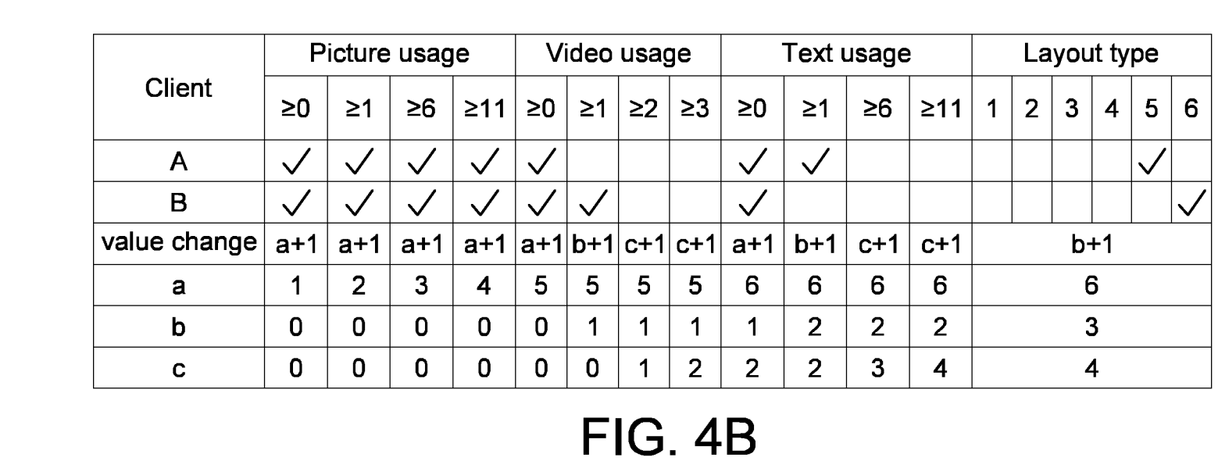
FIG. 4B is an example of calculating similarity according to one embodiment of the application.

FIG. 4A is a schematic diagram of the contents uploaded by multiple clients. FIG. 4B is an example of calculating similarity according to one embodiment of the application.

Referring to FIG. 4A, the contents uploaded by 6 clients (fashion industry client A, fashion industry client B, film and TV industry client C, automobile industry client D, transportation industry client E and transportation industry client F) are shown. Although the "interactivity" characteristic is not shown in FIG. 4A, anyone ordinarily skilled in the technology field of the invention will be able to obtain relevant technology of the interactivity characteristic from the content described in the embodiments of the invention. For example, in the client content of the fashion industry client A, (1) the picture usage of the fashion industry client A is higher than 11, and thus, the picture usage of the fashion industry client A covers the first to the fourth picture usage sub-groups; (2) the video usage of the fashion industry client A is 0 and thus, the video usage of the fashion industry client A covers the first video usage sub-group; (3) the information widget is not used; (4) the text usage of the fashion industry client A is 3 and thus, the text usage of the fashion industry client A covers the first and the second text usage sub-groups; and (5) the layout type is 5. The rest can be obtained by the same analogy.

The content grouping module 220 is configured to the client contents having high similarity as the same group. In a possible embodiment of the invention, the similarity is calculated according to the following formula:

$$\text{sim} = (a+c)/(a+b+c)$$

Wherein, "sim" denotes the similarity between two client contents (template); "a" denotes that the two client contents (template) both have the characteristic; "b" denotes that only one of the two client contents (template) has the characteristic; "c" denotes neither of the two client contents (template) has the characteristic. If the value of the similarity sim is greater than a pre-determined threshold (for example, the threshold is 0.5, but the invention is not limited thereto), this implies that the two clients have high similarity and can be regarded as the same group, and vice versa. In general, "a", "b" and "c" have initial value of 0.

In the present example, the similarity among client A to client F is analyzed. In the analysis, the similarity between client A and client B is analyzed to determine whether client A and client B client should be regarded as the same group. Then, the similarity between client A and client C is analyzed to determine whether client A and client C client should be regarded as the same group. By the same analogy, the similarities between all clients are analyzed.

In FIG. 4B, when calculating the similarity between fashion industry client A and fashion industry client B, the picture usage sub-group coverage, the video usage sub-group coverage and the text usage sub-group coverage are cumulative. In terms of the picture usage, both client A and client B use more than 11 pictures. The picture usage of the fashion industry client A covers the first to the fourth picture usage sub-groups; and the picture usage of the fashion industry client B covers the first to the fourth picture usage sub-groups. For example, both client A and client B cover the first picture usage sub-group, which means contents of client A and client B both have the characteristic (i.e. "the picture usage$\geq 0$"), and thus the "a" value is added by 1 (a=1, b=0 and c=0). Similarly, both client A and client B cover the second picture usage sub-group, which means contents of client A and client B both have the characteristic (i.e. "the picture usage$\geq 1$"), and thus the "a" value is added by 1 (a=2, b=0 and c=0). Similarly, client A does not cover the second video usage sub-group but client B covers the second video usage sub-group, which means only one of the contents of client A and client B has the characteristic (i.e. "the video usage$\geq 1$"), and thus the "b" value is added by 1 (a=5, b=1 and c=0).

On the other hand, the layout type is exclusive, and different industry categories have their own layouts. Since client A and client B use different layouts, the value of b is added by 1. The rest can be obtained by the same analogy. The final result shows that a=6, b=3 and c=4 and the value of "sim" is obtained as: sim=(a+c)/(a+b+c)=($10/13$)=0.76. Since sim=0.76 is greater than the threshold (0.5), fashion industry client A and fashion industry client B are regarded as the same sub-group.

The template recommendation module 230 selects a target content template suitable for the client from the database (not illustrated) of the content management system 130 according to the grouping result obtained by the content grouping module 220, and further transmits the selected target content template to be played by the content playing device(s) 110. That is, the template recommendation module 230 selects the content template with closer similarity from the database according to the grouping result of clients and further recommends the selected content template (the recommended content template is also referred as "the target content template") to the client.

In the embodiments of the invention, categorization and analysis are based on the content uploaded by the clients, and which group (that is, industry category) does the contents belong to is determined according to the contents uploaded by the clients. Then, a pre-determined target content template of the industry category is selected from the database and recommended to the client (that is, the pre-determined target content template of the industry category of the database has better design and can produce better marketing effect). The target content module recommended by the system can be displayed on the digital signature.

In the embodiments of the invention, the clients belonging to the same industry category still may have their own favorite content templates. Therefore, the smart content template recommendation system 100 may possibly recommend different target content templates to different clients belonging to the same industry category. For example, under the same catering industry, the target content template recommended to the clients of Chinese restaurants and that recommended to the clients of western restaurants by the smart content template recommendation system 100 may possibly be different.

The analysis and detection of the content characteristic parameters of the content template uploaded by the clients are disclosed below. It should be noted that the "content characteristic parameter" can be any combination of the picture usage, the video usage, the information widget, the text usage, the layout type and the interactivity.

Figure 5:
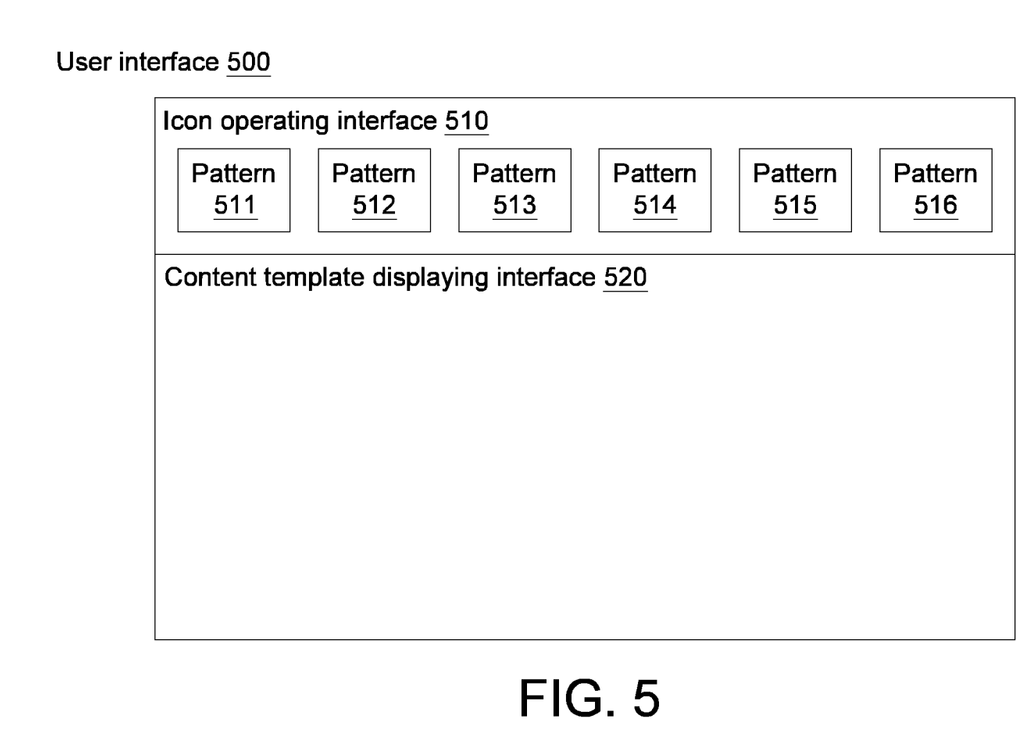
FIG. 5 is a schematic diagram of a user interface of a content editing device according to an embodiment of the invention.

In the embodiments of the invention, the user interface 500 of the content editing device 120 can be as indicated in FIG. 5. By clicking or operating the user interface 500 of the content editing device 120, the user can complete the to-be-uploaded client content. The user interface 500 of the content editing device 120 includes an icon operating interface 510 and a content template displaying interface 520. The icon operating interface 510 may include icons 511-516, respectively corresponding to the picture usage, the video usage, the information widget, the text usage, the layout type and the interactivity. That is, when the user clicks the icon 511, the user can add a picture to the content module displaying interface 520. When the user clicks the icon 512, the user can add a video to the content module displaying interface 520. When the user clicks the icon 513, the user can add an information widget to the content module displaying interface 520. When the user clicks the icon 514, the user can add a text to the content module displaying interface 520. When the user clicks the icon 515, the user can select a desired layout (such as anyone of layout 1 to layout 6 of FIG. 3), and apply the selected layout on the content module displaying interface 520. When the user clicks the icon 516, the user can add an interactivity element to the content module displaying interface 520.

The content template displaying interface 520 displays the client content which has been edited by the user. By analyzing the user's operations of the user interface 500, the content editing device 120 can obtain the content characteristic parameters of the client content (for example, the client content includes 2 pictures, 3 videos, 2 information widgets, and 11 texts, uses layout 5, and adds 3 interactivity elements). The content editing device 120 can upload the content characteristic parameters of the client content to the content management system 130 for the content grouping module 220 to analyze their similarities.

In another possible embodiment of the invention, the content characteristic parameters of the client content do not have to be uploaded to the content management system 130 from the content editing device 120. Instead, the content grouping module 220 of the content management system 130 can scan and analyze the received client content to obtain the content characteristic parameters of the client content. Such arrangement is also within the spirit of the invention.

In another possible embodiment of the invention, the user counts the content characteristic parameters and then uploads the content characteristic parameters to the content management system 130 by using the content editing device 120 (that is, the content characteristic parameters are not counted by the content editing device 120, and the content characteristic parameters are not obtained by the content management system 130 according to the analysis of the content). Such arrangement is also within the spirit of the invention.

In another possible embodiment of the invention, the user can tick the desired content characteristic parameters (for example, the amount of pictures) on the user interface 500, and then uploads the ticking result to the content management system 130 which then recommends a suitable target content module to the user. Such arrangement is also within the spirit of the invention.

A smart content template recommendation method is disclosed in another embodiment of the invention. The method includes receiving and analyzing a client content to recommend a target content template, wherein a content characteristic parameter of the client content includes any combination of a picture usage, a video usage, an information widget, a text usage, a layout type and an interactivity.

The smart content template recommendation method further includes collecting the client content and performing labeling on the client content according to the industry category and a content characteristic of the client content; and selecting the target content template from a database according to a grouping result of the client content.

The invention provides an automated smart content template recommend system, which analyzes the contents (or the content template) uploaded by the clients and then recommends suitable target content templates that meet the needs of respective industries to the clients. The recommended target content templates are displayed on the digital signature. Thus, the smart content template recommend system of the invention not only reduces the cost but further improves the marketing effect.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation to encompass all such modifications and similar arrangements and procedures.

What is claimed is:

1. A smart content template recommend system, comprising:
   a content editing device for a user to edit a client content, the client content being stored in the content editing device;
   a content management system coupled to the content editing device configured to receive and analyze the client content uploaded from the content editing device to recommend a target content template by grouping a plurality of clients based on similarity between a plurality of client contents; and
   at least one content playing device coupled to the content management system to play the target content template recommended by the content management system on a screen of the at least one content playing device, wherein the content editing device and the at least one content playing device are two independent devices, and the similarity between two client contents among the plurality of client contents is obtained based on whether that the two client contents both have a content characteristic, whether that only one of the two client contents has the content characteristic and whether neither of the two client contents has the content characteristic;
   wherein the content management system is configured to collect the client content uploaded from the content editing device and perform labeling on the client content according to an industry category and the content characteristic of the client content;
   the content management system is configured to perform similarity analysis to perform grouping the plurality of clients;
   the content management system is configured to select the target content template from a database according to a grouping result and further transmit the selected target content template to the content playing device;
   wherein in response to a desired content characteristic parameter ticked on a user interface, a tick result is transmitted to the content management system and the content management system performs similarity analysis.

2. The smart content template recommendation system according to claim 1, wherein a content characteristic parameter of the client content comprises any combination of a picture usage, a video usage, an information widget, a text usage, a layout type and an interactivity element.

3. The smart content template recommend system according to claim 2, wherein the layout type relates to a shape of an arranged picture or video, an amount of the arranged picture or video, or a position of the arranged picture or video.

4. The smart content template recommend system according to claim 1, wherein the content editing device uploads a content characteristic parameter of the client content to the content management system to perform similarity analysis.

5. The smart content template recommend system according to claim 1, wherein the content management system scans and analyzes the collected client content to obtain a content characteristic parameter of the client content, and the content management system performs similarity analysis.

6. The smart content template recommend system according to claim 1, wherein in response to a counted content characteristic parameter of the client content, and in response to an uploaded content characteristic parameter of the client content from the content editing device to the content management system, the content management system performs similarity analysis.

7. A smart content template recommendation method, comprising:
   receiving and storing a client content in a content editing device;
   analyzing the client content uploaded from the content editing device to recommend a target content template by grouping a plurality of clients based on similarity between a plurality of client contents and to play the target content template on a screen of at least one content playing device,
   wherein a content characteristic parameter of the client content comprises any combination of a picture usage, a video usage, an information widget, a text usage, a layout type and an interactivity element, the similarity between two client contents among the plurality of client contents is obtained based on whether that the two client contents both have a content characteristic, whether that only one of the two client contents has the content characteristic and whether neither of the two client contents has the content characteristic and the content editing device and the at least one content playing device are two independent devices;
   collecting the client content uploaded from the content editing device and performing labeling on the client content according to an industry category and the content characteristic of the client content;

performing similarity analysis to perform grouping the plurality of clients, wherein in response to a desired content characteristic parameter ticked on a user interface, a tick result is transmitted and similarity analysis is performed;

selecting the target content template from a database according to a grouping result and further transmit the selected target content template to the at least one content playing device.

8. The smart content template recommend method according to claim 7, wherein the layout type relates to a shape of an arranged picture or video, an amount of the arranged picture or video, or a position of the arranged picture or video.

9. The smart content template recommend method according to claim 7, further comprising:

in response to an uploaded content characteristic parameter of the client content, performing similarity analysis.

10. The smart content template recommend method according to claim 7, further comprising:

scanning and analyzing the received client content to obtain the content characteristic parameter of the client content, and performing similarity analysis.

11. The smart content template recommend method according to claim 7, wherein in response to a counted content characteristic parameter of the client content, and in response to an uploaded content characteristic parameter of the client content, similarity analysis is performed.

* * * * *